July 28, 1942. A. H. GLEASON ET AL 2,291,574
METHOD FOR THE CHLORINATION OF POLYMERIC COMPOUNDS
Filed Aug. 12, 1938 2 Sheets-Sheet 2

Anthony H. Gleason
Raphael Rosen Inventors
By J. K. Small Attorney

Patented July 28, 1942

2,291,574

UNITED STATES PATENT OFFICE 2,291,574

METHOD FOR THE CHLORINATION OF POLYMERIC COMPOUNDS

Anthony H. Gleason and Raphael Rosen, Elizabeth, N. J., assignors to Jasco, Incorporated, a corporation of Louisiana Application August 12, 1938, Serial No. 224,502

5 Claims. (Cl. 204—163)

This invention relates to a method and apparatus for the chlorination of organic polymers, and more particularly to the chlorination of polymers of high molecular weight by the action of radiant energy.

An object of the invention is to provide a method for causing an efficient and rapid reaction of chlorine with the polymer. Another object is to effect the reaction by means of radiation, without causing precipitation of over-halogenated material from the solution, due to the exposure of an immobile layer of the solution to intense radiation. Another object is to provide a continuous process for such halogenation reaction. Other objects will be apparent from the detailed description of the invention given below.

We have found that the objects above set forth may be attained by first dissolving the polymer in an inert, volatile solvent, passing a substantial quantity of free chlorine into the solution thus formed, and then exposing a film of this solution to the action of light, for example, by flowing the solution down a vertical or inclined surface in close proximity to a lamp giving radiation of a suitable intensity. The reaction may also be brought about by moving a film of polymer solution into the reaction zone and then exposing it to the simultaneous action of light and chlorine. The solvent may be removed from the product formed by any convenient method, for example, by distillation or evaporation.

The method is applicable to the chlorination of organic polymers, particularly polymers of the linear or chain type formed by progressive condensation of olefins and having relatively little unsaturation in the resulting carbon chain. Included among such polymers are, for example, such substances as olefin polymers, polymerized vinyl halides and vinyl ethers, polymerized acrylic acid and its derivatives, polymerized styrene, polymerized indene, hydrogenated rubber, etc.

This method has been found particularly suitable for the chlorination of isobutylene polymers, for example, those having molecular weights of approximately 15,000 to 200,000 such as are prepared by polymerization of isobutylene at a temperature of —40° to —80° C. with boron fluoride. Copolymers, formed by the co-polymerization of various combinations of resins of different chemical composition, are also included. Examples of such co-polymers are co-polymers of vinyl chloride and vinyl ether, co-polymers of styrene and acrylic acid and co-polymers of olefins and di-olefins. The formation of co-polymers may be illustrated by the method of preparation of co-polymers of olefins and diolefins. These co-polymers are formed, for example, by reacting a low molecular weight olefin hydrocarbon with a low molecular weight diolefin in the presence of a Friedel-Craft catalyst or catalyst complex, at a temperature below 0° C. One such co-polymer may, by way of illustration, be formed by reacting isobutylene and butadiene in the presence of a 5% solution of aluminum chloride in ethyl chloride, at a temperature below —50° C., preferably about —95° C. This co-polymer is a solid plastic product, soluble in carbon tetrachloride. Similar co-polymers are formed from other straight chain olefins and iso-olefins containing not more than seven carbon atoms, and from other diolefins, such as isoprene, cyclopentadiene and the like.

Of further particular importance among those substances mentioned as adapted to chlorination by the method of the present invention are the products of the polymerization of vinyl compounds, such as vinyl halides, vinyl ethers, etc. A polymerization product may be formed, for example, by exposing a solution of vinyl chloride in 99% ethyl alcohol to the action of the extreme ultra-violet light at temperatures between 15.2° and 25.2° C., or by exposing the solution to visible light in the presence of a salt of manganese, cobalt, nickel, copper, vanadium or uranium. The polymer is deposited as a white powder, which is soluble in inert solvents, such as carbon tetrachloride.

A still further class of substances particularly adapted to chlorination by the present method are the polymerization products of styrene, including the forms produced by polymerization at low temperatures (below about 175° C.) and at high temperatures, and either in the presence or absence of a catalyst. One such polymer, produced at a low temperature and in the absence of a catalyst, may be formed, for example, by heating styrene of at least 92% purity in a closed vessel for 20 hours at 140° C. The polymer may then be dissolved in a suitable solvent, such as carbon tetrachloride and chlorinated by the method described in detail below.

It is desirable, in carrying out the process of this invention, to prepare solutions of the polymer of such viscosity as will permit convenient handling in the process of briefly exposing the solution to the action of light, and when the method of flowing the solution down a vertical or steeply inclined surface is used, a solution having a viscosity of 2½ to 3 poises is quite satisfactory.

The solvent chosen should be inert to the polymer and chlorine or at most should react only very slowly under the conditions of the process, and it should be a good solvent for both the reactants and is preferably sufficiently volatile to be removed from the product by evaporation or distillation. Carbon tetrachloride has been found to be a good solvent for the treatment of isobutylene polymer at ordinary temperatures, while chloroform is more suitable at low temperatures. A 5 to 5½ solution of isobutylene polymer of a molecular weight of 60,000 to 80,000 in carbon tetrachloride, has, for example, been found to have a viscosity particularly suitable for treatment by the methods of the present invention.

In the preferred method of carrying out the invention, the solution of the polymer should be substantially saturated with chlorine if it is desired to obtain the maximum chlorine content in the final product. The amount of the chlorine that it is possible to introduce into the polymer depends partly upon the ratio of the amounts of chlorine and polymer dissolved in the solution, and partly upon the temperature of chlorination. For a given solution of the polymer, the amount of chlorine that may be dissolved varies with the pressure under which the chlorine is introduced. The chlorine may be passed in and the solution exposed to radiation at ordinary atmospheric pressure or at moderately elevated pressures, such as 5 or 6 lbs. per square inch, although pressures of 15 to 30 lbs. per square inch, or even much higher, may be used. An initial temperature of 0 to 25° C., is ordinarily used for the saturation, and the resulting solution is usually passed at about the saturation temperature into the reaction zone, where a maximum film temperature of about 50° C. is attained during the reaction in the presence of light. Much lower initial temperatures may be used, the lower temperatures tending to produce products of higher chlorine content and of greater flexibility, while initial temperatures higher than about 0° C. tend to produce more brittle products. In general, a product having a high chlorine content tends to be harder than products having less chlorine, while with a given chlorine content, a high temperature of reaction tends to degrade the polymer and to develop brittleness.

The exposure to light may be carried out in any suitable type of apparatus which permits the moving of a thin film of the polymer solution containing chlorine into the presence of light, or provides for moving a film of polymers into a zone of simultaneous exposure to light and chlorine, and which also provides for fairly rapid removal of the solution after treatment. This solution is usually brought to a distance of only a few inches from the source of light during the treatment period, the surface of the film exposed to the radiation preferably being free, i. e., out of contact with any solid surface. It is desirable to effect the entire reaction in one pass, owing to the fairly rapid degradation of the polymer and consequent loss of viscosity in the solution, which ordinarily occurs during exposure to light. Otherwise, it is usually necessary to reconcentrate the solution to approximately the original viscosity and re-expose it to the light in order to obtain sufficient contact with chlorine in the presence of light to obtain a product of the desired chlorine content. When a strong mercury vapor or white flame arc lamp is used, it is preferable to remove heat waves and ultra-violet rays as much as possible. To this end, the light is filtered through "Pyrex" glass and a layer of water, whereby nearly all of the ultra-violet rays and the long infra-red and heat waves are removed. The preferable range of radiation, therefore, is that of wave lengths from the short infra-red up to, but not including, the ultra-violet.

The light sources found particularly useful in the present invention are strong mercury vapor or white flame arc lamps. Other light sources, however, may be used, such as an ordinary "Mazda" lamp of 500 watt capacity, carbon arcs in which the carbon may be impregnated or not with minerals, and sunlight.

Several forms of apparatus suitable for use in carrying out the present invention are shown in the accompanying drawings, in which—

Similar numbers refer to similar elements throughout the several figures.

Figure 1:
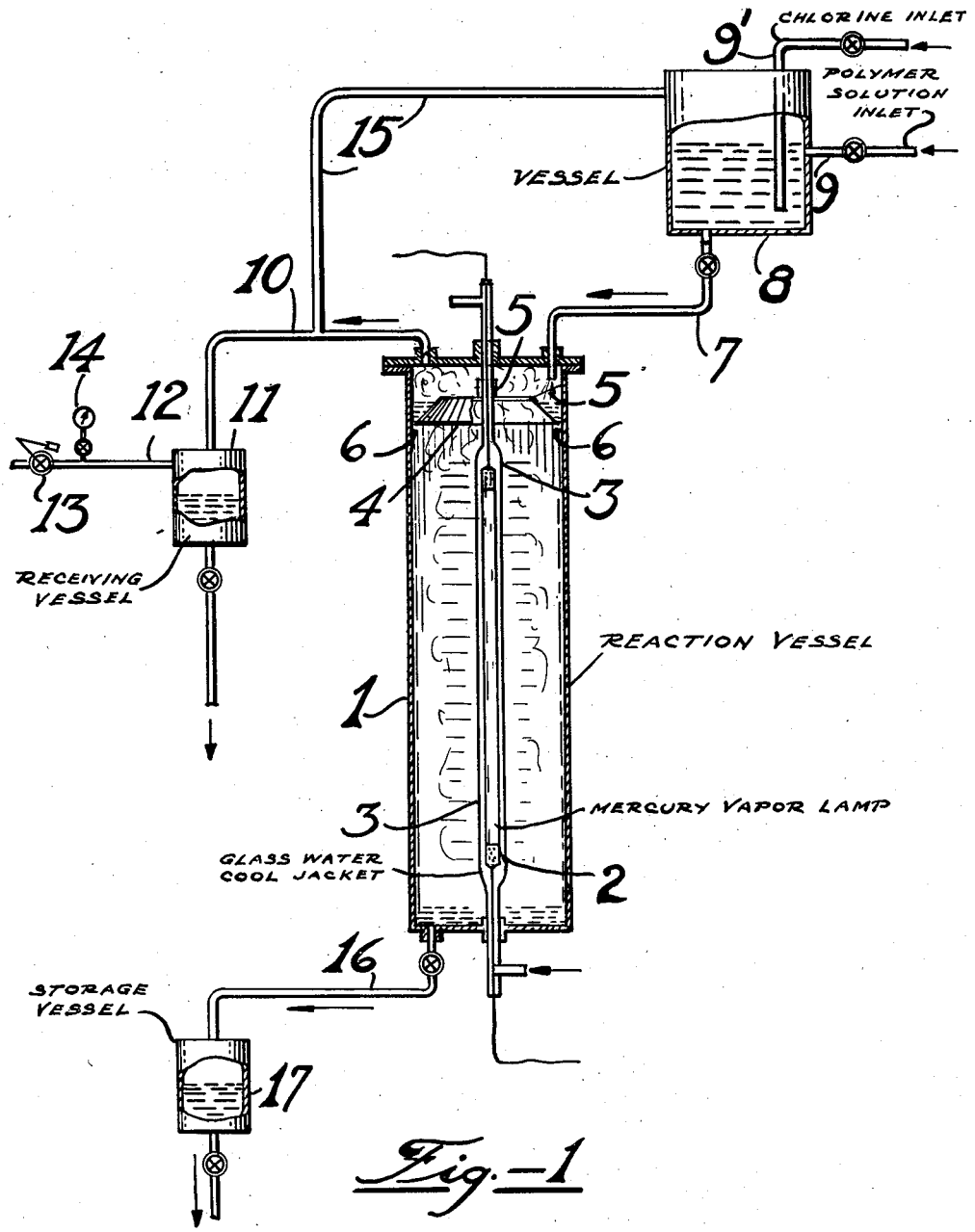
Fig. 1 shows an elevation view, partly in section, of a vertical cylindrical chamber reactor and connecting apparatus.

In the form of apparatus shown in Fig. 1, cylinder 1 is arranged with a concentrically located mercury vapor lamp 2 and its "Pyrex" glass water-cooling jacket 3. The conical distributing head 4 is open at its center and is supported by any suitable supporting members 5. This distributing head is arranged to form a narrow annular passage 6 between the head and the walls of the cylinder 1, this narrow passage serving to permit the viscous polymer solution to flow in fairly even distribution down the walls of the cylinder. For the purpose of providing more even distribution of the solution, means may be provided for rotating the cylinder during the process. The reaction vessel 1 is connected by supply pipe 7 to the vessel 8. The polymer solution is supplied through pipe 9 and after entering the vessel is treated with chlorine through inlet pipe 9'. If the process is to be made continuous, a second supply vessel may be provided, and the two vessels may be used alternatively, one being used for charging a batch of polymer with chlorine while the other is used to feed the reaction chamber. Outlet pipe 10, connected to the top of the reaction vessel 1, serves to lead off the hydrogen chloride evolved in the reaction. Pipe 10 leads to vessel 11, which is a trap for catching any solvent that may be carried over along with the hydrogen chloride. This trap may be cooled, or a condenser may be placed in line 10 to condense the solvent vapor. Pipe 12 leads from vessel 11 to pressure regulating valve 13. A pressure gauge 14 may be connected to pipe 12. Pipe 15 connects the upper part of vessel 8 with pipe 10 and serves to equalize the gas pressure in all parts of the apparatus. Pipe 16 leads from the bottom of reaction vessel 1 to a storage vessel 17. The reaction vessel 1 may be made of any suitable acid-resistant material, such as glass, porcelain or acid-resistant alloys. If made of glass, a reflecting surface may be provided for conserving the radiation energy from the lamp.

In the operation of this form of the apparatus, shown in Fig. 1, a solution of the polymer to be treated is led into vessel 8 through pipe 9 and gaseous chlorine is led in through pipe 9' until the pressure gauge 14 shows the pressure at which the reaction is to be carried out, and the admission of chlorine is continued for a considerable time, say one-half hour, in order to saturate the solution with chlorine at that pressure. Pressure regulating valve 13 will control the pressure to the desired limit. A slow stream of the saturated solution is then permitted to flow through pipe 7 to the conical surface of distributing head 4, where a portion of the solution will collect and be gradually permitted to flow through the annular space 6 down the interior walls of cylinder 1. The downwardly flowing film of the solution will be uniformly exposed to the action of the light from the lamp 2 radiating through water jacket 3. The reaction takes place rapidly with evolution of hydrogen chloride, and as the film approaches the bottom of the vessel, its viscosity is considerably decreased due to the partial degradation of the polymer under the influence of the light. The reacted solution collects at the bottom of vessel 1 and may be drawn off into the vessel 17. The hydrogen chloride evolved in the reaction escapes through the open central portion of head 4 and passes out through pipe 10 into vessel 11, which is cooled to condense any portions of solvent that may have been volatilized and carried over with the hydrogen chloride. The accumulating hydrogen chloride is allowed to escape through the pressure regulating valve 13, and may be recovered, if desired, by any suitable means.

Figure 2:
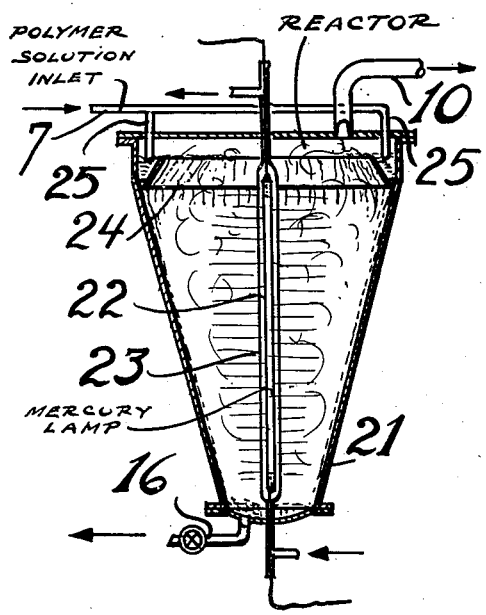
Fig. 2 shows a sectional view of a conical form of reaction chamber.

Fig. 2 shows an alternative form of reactor of the general type shown in Fig. 1. In Fig. 2 the reactor is of conical shape, the narrower portion being at the bottom. Mercury lamp 22 and its cooling jacket 23 are arranged vertically in the center of the enclosed reaction chamber 21. An annular member 24 projects from the interior wall of the reaction chamber near the top of its conical portion and serves to distribute the polymer solution over all portions of the chamber. Inlet tubes 25 connect with supply pipe 7 and discharge the solution in the annular reservoir formed by the member 24 and the walls of the vessel.

In the operation of this form of the apparatus the solution of the polymer is introduced by means of pipe 7 and inlet tubes 25, whereby the hereinbefore mentioned annular reservoir formed by the member 24 and the wall of the vessel is filled with the solution, which finally overflows the edge of member 24 and is carried by gravity down the sloping walls of the vessel 21, while being exposed to the light from lamp 22. The advantage of this form of apparatus consists in the fact that during the first portion of the exposure, while the solution is still relatively viscous and the rate of flow is relatively slow, the solution will be at a relatively greater distance from the lamp and will receive less concentrated radiation, while during the latter portion of the exposure after the light has caused some degradation of the polymer and consequent lowering of the viscosity of the solution, the solution will have the advantage of exposure to more concentrated radiation during the more rapid flow. Thus, the solution is saved from too great a degradation and loss of viscosity in the earlier stages of its exposure.

Figure 3:
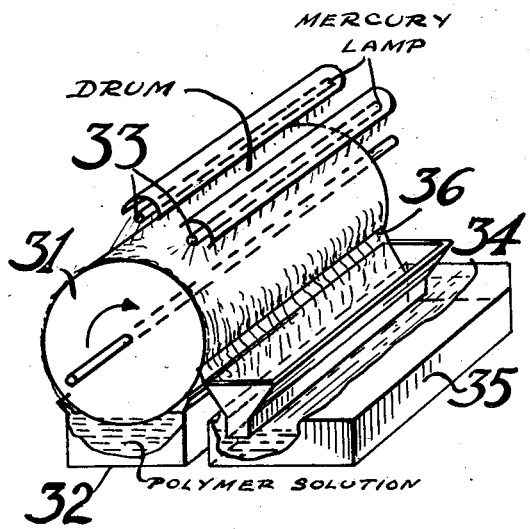
Fig. 3 shows a perspective of a revolving drum type of apparatus.

In Fig. 3 is shown an apparatus arranged to mechanically carry a film of the polymer solution through a zone of exposure to a source of light. The film is carried on the surface of a cylindrical drum 31 which dips into a body of the solution contained in a shallow tank or trough 32. As the drum turns a film of the solution is carried into proximity to the lamps 33, which are arranged to treat the film as it moves on the downward portion of its journey. The light treatment will considerably lower the viscosity of the liquid forming the film and will cause the solution to fall away from the drum into trough 34 before it again reaches the tank 32. The removal of liquid from the drum surface is completed by the scraping or wiping element 36. The treated solution may be collected in reservoir 35.

Figure 4:
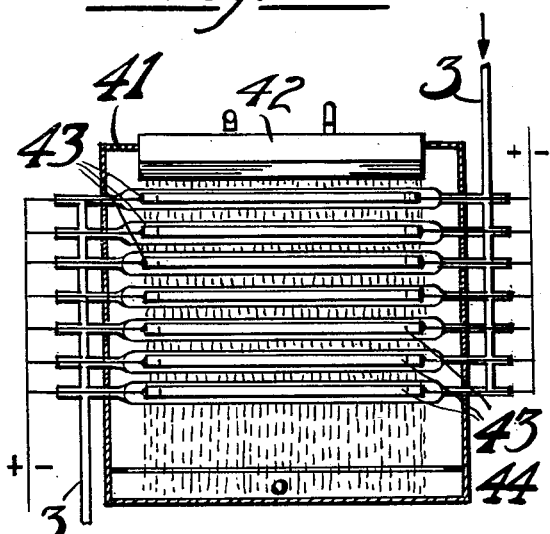
Figs. 4 and 5 represent longitudinal sectional and cross-sectional views respectively, of a form of apparatus in which a freely falling sheet of the solution is exposed to a battery of lamps.
Figure 5:
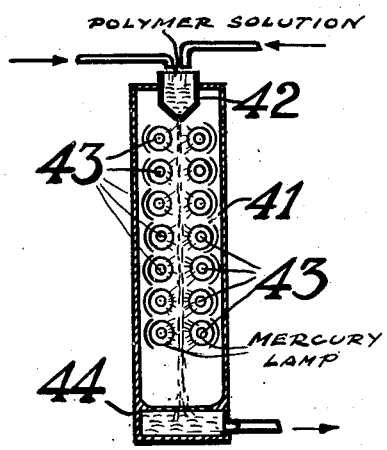

In a still further modification of apparatus, which is suitable for carrying out the reaction of the invention, an arrangement may be made for exposing the solution to the action of light while it is freely falling in the form of a sheet or curtain of small streams or drops. Such an apparatus is shown in Figs. 4 and 5, where a frame or enclosed structure 41 supports a trough 42 having a very narrow longitudinal opening at its bottom. The polymer solution is held within trough 42 and is allowed to fall vertically from the said narrow opening to a receiving tank 44 at the bottom of the apparatus. A battery of lamps 43 is arranged to give the falling liquid a strong light treatment.

After exposure to the action of light in any suitable form of apparatus the solvent may be removed by evaporation or distillation, or the product may be precipitated from its solution by the addition of suitable reagents, and the solvent may be washed with water or weak alkali to remove any iron salts present, and then recovered in pure form by distillation, and then may be used for further light treating operations. The chlorinated polymer product, may be worked on an acid-resistant kneader or mill until the last traces of the solvent are removed. The product usually consists of a tough plastic or brittle resin. If desired, the product may be stabilized by treating the solution before separation of the product with a hot weak alkali solution or by incorporating a small amount of an organic amine in the product.

As an illustration of the method of preparing chlorinated olefin polymers according to the present invention, the following example will be described in detail:

*Example 1*

An apparatus similar to that illustrated in Fig. 1 of the drawings is provided, the reaction chamber having a diameter of about 4 inches and a length of about 2 feet. The lamp providing the radiant energy for the reaction is an A. C. "Uviarc" mercury vapor lamp, type H—1, with quartz bulb, consuming 450 watts with an overall efficiency of 35 lumens per watt. The process is started by partially filling the supply vessel with a 5% solution of polymerized isobutylene of molecular weight of about 70,000 in carbon tetrachloride. Chlorine is passed into the solution at room temperature until the pressure gauge shows a gas pressure within the apparatus of about 6 lbs. per square inch, and the admission of chlorine is continued for about one-half hour longer to assure saturation of the solution. The gas pressure of 6 lbs. per square inch is maintained throughout the chlorinating operation. A slow stream of the saturated solution is then allowed to pass into the reaction chamber and to be collected around the distributing head to fall along the vertical walls of the chamber while the mercury vapor lamp is in operation. A temperature rise of 30 to 40° C. takes place on the portion of the wall where reaction occurs. The treated solution is continuously drawn off from the bottom of the reaction chamber. The product formed is precipitated from the carbon tetrachloride solution by adding alcohol or acetone, and the product is worked in a kneader until the last traces of solvent are removed. The carbon tetrachloride is removed from the mixture with alcohol or acetone by distillation and may be used for further operations. The final product consists of a grayish or transparent resin of relatively low softening point. It is fairly hard and somewhat brittle at room temperature, but it is relatively plastic and may be molded at temperatures of 50-100° C. It is non-inflammable, and is soluble in chlorinated hydrocarbons and in aromatic type solvents, but is only slightly soluble in gasolines and mineral lubricating oils, and is insoluble in petroleum ether and the lower aliphatic alcohols, ketones and esters.

The chlorinated olefin polymer products of the present invention, consisting of resins of various degrees of plasticity or brittleness, depending upon the starting materials used, the degree of chlorination and the conditions under which the chlorination reaction takes place, may be used for many purposes. For example, they may be used as fire-resistant agents, for impregnating various types of porous or fibrous materials, such as cloth, paper and building materials. They may also be mixed with inert organic materials and added to solutions of artificial silk for the purpose of delustering the silk product. They may also be incorporated with wax and used for impregnating wood for preservation purposes. Again, the products may be used in conjunction with suitable soft resins and pigments, volatile solvents, etc., in the compounding of paints which are non-inflammable and resistant to chemical and mechanical influences. Many other uses will doubtless occur to those skilled in the art of compounding resinous materials.

It is not intended that the invention be limited to any specific examples which are presented here solely for the purpose of illustration nor to any theories of the operation of the invention, but is to be limited only by the appended claims, in which it is intended to claim all novelty inherent in the invention as broadly as the prior art permits.

We claim:

1. The method of chlorinating a high molecular weight olefin resin which comprises forming a solution having a viscosity not greater than about three poises of the resin in a free-flowing volatile solvent substantially inert to the olefin resin and to chlorine, mixing chlorine with the solution, rapidly flowing the solution in the form of a thin film through a zone in which it is exposed to light waves, thereby bringing about rapid reaction of the chlorine with the resin, the exposure being under conditions whereby the film surface exposed most directly to the radiation is free from contact with a solid surface, and quickly removing the thus chlorinated resin from the reaction zone to prevent over-polymerization and formation of insoluble precipitate.

2. The method according to claim 1 in which the distance between the film and the source of light waves is decreased during the exposure.

3. The method of chlorinating a high molecular weight isobutylene polymer which comprises forming a solution having a viscosity not greater than about three poises of the polymer in carbon tetrachloride, mixing chlorine with the solution, rapidly flowing the solution in the form of a thin film through a zone in which it is exposed to light waves, thereby bringing about rapid reaction of the chlorine with the polymer, the exposure being under conditions whereby the film surface exposed most directly to the radiation is free from contact with a solid surface, and quickly removing the chlorinated polymer from the reaction zone to prevent over-polymerization and formation of insoluble precipitate.

4. The method of chlorinating a high molecular weight isobutylene polymer which comprises forming a solution having a viscosity not greater than about three poises of the polymer in chloroform, mixing chlorine with the solution, rapidly flowing the solution in the form of a thin film through a zone in which it is exposed to light waves, thereby bringing about rapid reaction of the chlorine with the polymer, the exposure being under conditions whereby the film surface exposed most directly to the radiation is free from contact with a solid surface, and quickly removing the chlorinated polymer from the reaction zone to prevent over-polymerization and formation of insoluble precipitate.

5. The method of chlorinating an isobutylene polymer of about 15,000 to about 200,000 molecular weight which comprises forming a solution having a viscosity of about two and one-half to three poises of the polymer in carbon tetrachloride, mixing chlorine with the solution, rapidly flowing the solution in the form of a thin film through a zone in which it is exposed to light waves, thereby bringing about rapid reaction of the chlorine with the polymer, the exposure being under conditions whereby the film surface exposed most directly to the radiation is free from contact with a solid surface, and quickly removing the thus chlorinated polymer from the reaction zone to prevent over-polymerization and formation of an insoluble precipitate.

ANTHONY H. GLEASON.
RAPHAEL ROSEN.